United States Patent Office 2,931,905
Patented Apr. 5, 1960

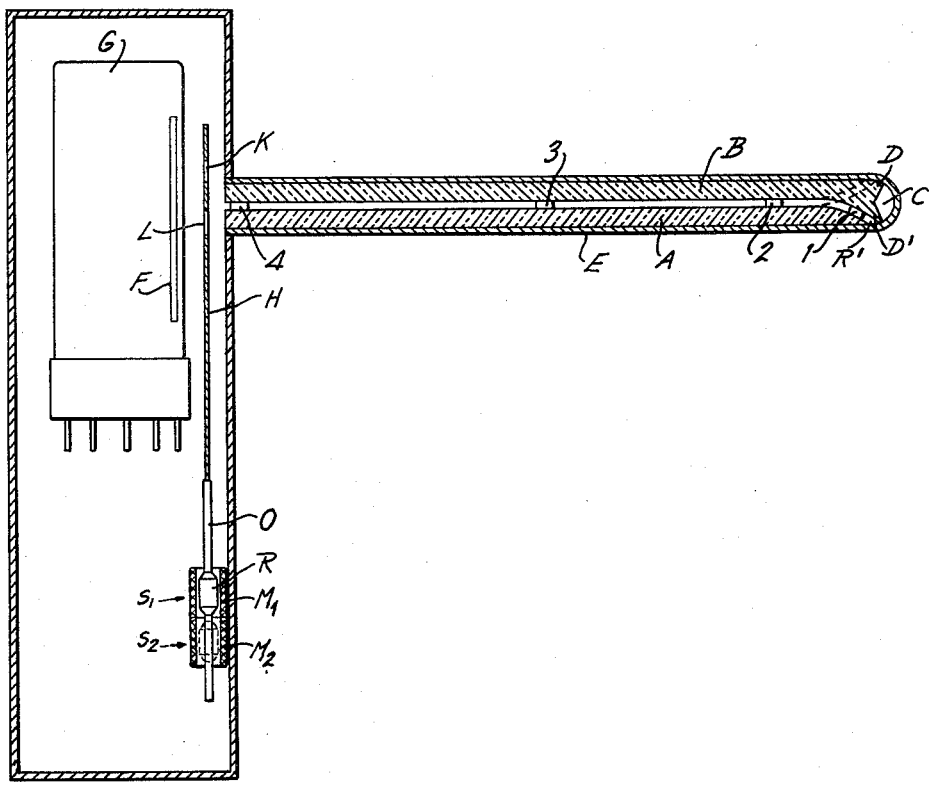

2,931,905

PROBE FOR A SCINTILLATION METER ARRANGEMENT

Archimiro Caha and Vladimír Prokeš, Brno, Czechoslovakia

Application February 6, 1958, Serial No. 713,725

Claims priority, application Czechoslovakia February 11, 1957

7 Claims. (Cl. 250—71.5)

The present invention relates to a probe for a scintillation meter arrangement suitable particularly for measuring the intensity of radiation in the cavities of the human body and everywhere, where the radiating effect of radioactive material as for instance Ra, Co, Sr etc. used in radium therapy should be measured at small distances or where the effect of radiation of X-rays should be measured.

It is an object of this invention to eliminate the disturbing effect of the luminescence of the light conductor used for such measurements. Another object is to eliminate the direct effect of the source of radiation upon the photomultiplier and of its dark current upon the measuring results. Further improvements and advantages of the object of this invention will be apparent from the following specification.

For dosimetric measurements of ionizing radiation, devices are generally used at the present time, whose function is based upon the ionizing effect of the radiation on gases. The measuring of the roentgen radiation, where we generally work at a sufficient distance from the source of radiation, so that a substantially homogeneous field is present, does not offer any particular difficulties. The ionization chamber may be of sufficiently large dimensions, so that the ionization currents are equally sufficiently large and may be comparatively easily measured within a certain range.

Dosimetric measurements of beta and gamma radiations are rather more difficult. There are substantially lower intensities of radiation and moreover the intensity of radiation changes considerably with the distance from the source of radiation. Small ionization chambers have to be used therefore to obtain substantially equal radiation intensity in all parts of this chamber. Any reduction of the size of the ionization chamber manifests itself however by a reduction of the ionizing current in the corresponding proportion. Ionization chambers of the volume of several mm.³ have been designed, the ionizing currents have been however of the order of $10^{-15}$ to $10^{-17}$ amps. The measuring of such low currents is still possible after amplification by electrometric electron valves, the apparatus of this kind are however too delicate for routine measurements.

Presently known scintillation meters comprise a light conductor, on one end of which a luminescent crystal is fixed. Light conductors are generally solid cylinders or prisms of quartz or of some artificial material. The light conductor is linked by its other end optically with the photocathode of an electron multiplier. The luminescent crystal, the light conductor and the photomultiplier tube are placed in light tight cases. For scintillation meters designed for measurements in small spaces, the detecting part of the probe is represented by a small crystal of luminescent material. The light conductor must equally be of small diameter so that it may be easily inserted into the cavities of the human body.

The energy of the beta or gamma radiation, which is absorbed in the luminescent material is converted into photons of visible light, which pass furthermore through the light conductor to the photocathode of a photomultiplier. Te photomultiplier detects the photons of visible light in accordance with their amount either as current impulses or as current. In presently known designs of probes of scintillation meters the influence of the gamma radiation upon the photomultiplier affects the accuracy of the measurement, as it is rather difficult to eliminate it completely. At first lead screening was used, now light tight light shutters are used for eliminating this effect, which shutters are placed between the light conductor and the photocathode of the photomultiplier tube. The current originating by direct action of the beta or gamma radiation on the photocathode may be then compensated simultaneously with the dark current of the photomultiplier.

There remains however the disturbing effect of the luminescence, which is present in all light conductors. Its effect is higher, when the efficiency of the luminescent material is lower. The luminescence of the light conductor manifests itself as a considerable change of the directive characteristic. If the radioactive sample is at a small distance from the light conductor and far from the crystal of luminescent material, we obtain on the measuring instrument values differing considerably from the values corresponding to the ionizing intensity at the place of the luminescent crystal.

In case the light conductor is eliminated, the sensibility of the instrument decreases so much that it becomes useless for pratical measurements. The result does not improve much if the interior wall of the thin protective case is highly polished.

The disturbing effect of the luminescence of the light conductor could be theoretically eliminated by special colour filters (provided the wavelengths of the luminescent light of the crystal and of the light conductor are different) or by the use of different waveband transformers, by means of which the maximum luminescence of the light conductor would be shifted to wavebands, for which the photomultiplier is no more sensitive.

In accordance with this invention, a special arrangement of the light conductor is used in connection with auxiliary light shutters, which enable to eliminate the said drawbacks.

An embodiment of invention is illustrated by way of example schematically by the accompanying drawing. The main parts of the scintillation meter as shown are the luminescent crystal C on the extremity of a light conductor consisting of two parts A and B, a light shutter H with the corresponding control means and a photomultiplier tube G. The light conductor, preferably of circular cross section, consists of two parts A and B divided by a longitudinal cut R' which parts are held apart by spacing blocks 1, 2, 3 and 4. The outer end of the upper part B of the light conductor bearing a luminescent crystal C, for instance, a diamond, has a spherical shape, with the cut R' receding downwards, so that at this end the upper part B of the light conductor is larger with respect to the lower part A in view of the spherical head portion D, D' into which the crystal C is embedded. Both parts A and B are inserted into a light tight casing E. Between the inner end of the light conductor A, B and the photocathode F of the photomultiplier tube G a light shutter H is inserted, provided with two openings K and L, the shape of which corresponds to the shape of the cross section of the parts A and B, respectively, of the light conductor. The light shutter H is fixed on a bar O passing through the coils $M_1$ and $M_2$ of an electromagnet. The bar O carries a core R, which is shifted, depending upon whether the coil $M_1$ or $M_2$ is energized, into the position $S_1$ or $S_2$. It is obvious that any other type of control of the position of the shutter H may be used, for instance a pneumatic control, without deviating from the scope of this invention.

In case the ionization effect of a certain object has to be measured, the probe of the scintillometer is positioned at a certain distance from this object. The crystal C is thus brought to luminescence and equally both parts A and B of the light conductor. As both these parts have their surfaces treated so as to correspond practically to the conditions for total reflection, no luminescent light is passing from A to B or vice versa, the luminescence of the detector crystal C is therefore passed to the tube G only through the part B. When we do not consider the luminescence of the crystal C, both parts A and B of the light conductor would have practically the same luminescence, differing solely for values, the differences of which are due to their different distances from the source of radiation, which are negligible. The increase of the volume of the part B due to the head parts D and D', where the luminescent crystal C is embedded, does not manifest itself in a disturbing way, as this relatively small fraction of the whole part B is in the closest neighbourhood of the crystal C. The luminescence of the crystal C is however of a much higher order than that of the parts D and D'. Both said deviations may be however mutually eliminated.

The control of the light shutter is achieved electromagnetically by means of said two coils $M_1$ and $M_2$.

If the coil $M_1$ is energized, the core R, firmly connected to the rod O and to the light shutter H is pulled into this coil and takes the position $S_1$. In this position of the shutter H the passage of the luminescent light from the crystal C and of the luminescent light which originates in the part B of the light conductor is barred and the passage of the luminescent light from the part A of the light conductor is admitted to the photocathode F. In this so-called "compensating" position of the light shutter H the dark current of the photomultiplier G, the direct effect of the radiation of the source of radiation upon that photomultiplier G and the luminescence of the part A of the light conductor may be compensated against each other. This compensation may be achieved simply and quickly by adjusting the zero position of the measuring apparatus.

When the coil $M_2$ is energized, the core R is pulled into this coil into the position $S_2$. In this "measuring" position the passage of the light from the part A of the light conductor is barred and the luminescent light from the crystal C and the part B of the light conducor has free passage to the photocathode F of the photomultiplier G through the shutter opening K. The measuring apparatus shows then on its scale a deflection representing a correct value as the setup has been already compensated for the luminescence of part B by the previous adjustment for that of part A.

The just described probe of the scintillation meter has been originally devised to measure quickly the intensity of beta or gamma radiation in cavities of the human body as for instance in the vagina, rectum, and the bladder when applying in gynecological practice Ra, Co or, at other applications, of Sr on the surface of the skin.

It may be used for a quick measuring of different auxiliary material used for maintaining the radioactive samples in the proper place and for the control of the application of radioactive material in different places of the body for instance in the mouth etc.

It may be equally used for measuring roentgen radiation when using a suitable luminophor.

After some adjustments it may serve for industrial purposes as detectoscope and for geological survey work, for instance for oil prospecting.

What we claim is:

1. A probe for a scintillation meter, comprising, in combination, luminescent crystal means; elongated light conductor means longitudinally divided into two substantially equal light conductor members having surfaces capable of substantially total reflection, one of said conductor members being formed at its free outer end with an extension accommodating said crystal means so that light derived from the luminescence of said crystal means is passed only through said one of said light conductor members; photoelectric light-sensitive means arranged adjacent to the opposite ends of both said light conductor members; and movable shutter means located across the path of light from said light conductor means to said photoelectric means for alternatively permitting, depending upon the position of said shutter means, passage of light from said one and the other light conductor member, respectively, to said photoelectric means.

2. A probe for a scintillation meter, comprising, in combination, luminescent crystal means; elongated light conductor means longitudinally divided into two substantially equal light conductor members having surfaces capable of substantially total reflection, one of said conductor members being formed at its free outer end with an extension accommodating said crystal means so that light derived from the luminescence of said crystal means is passed only through said one of said light conductor members; a light-tight housing enclosing said light conductor means and said crystal means; photoelectric light-sensitive means arranged adjacent to the opposite ends of both said light conductor members; and movable shutter means located across the path of light from said light conductor means to said photoelectric means for alternatively permitting, depending upon the position of said shutter means, passage of light from said one and the other light conductor member, respectively, to said photoelectric means.

3. A probe for a scintillation meter, comprising, in combination, luminescent crystal means; elongated light conductor means longitudinally divided into two substantially equal light conductor members having surfaces capable of substantially total reflection, spacer means being provided for holding said light conductor members spaced from each other, one of said conductor members being formed at its free outer end with an extension accommodating said crystal means so that light derived from the luminescence of said crystal means is passed only through said one of said light conductor members; a light-tight housing enclosing said light conductor means and said crystal means; photoelectric light-sensitive means arranged adjacent to the opposite ends of both said light conductor members; and movable shutter means located across the path of light from said light conductor means to said photoelectric means for alternatively permitting, depending upon the position of said shutter means, passage of light from said one and the other light conductor member, respectively, to said photoelectric means.

4. A probe for a scintillation meter, comprising, in combination, luminescent crystal means; elongated light conductor means longitudinally divided into two substantially equal light conductor members having surfaces capable of substantially total reflection, one of said conductor members being formed at its free outer end with an extension accommodating said crystal means so that light derived from the luminescence of said crystal means is passed only through said one of said light conductor members; photoelectric light-sensitive means arranged adjacent to the opposite ends of both said light conductor members; movable shutter means located across the path of light from said light conductor means to said photoelectric means for alternatively permitting, depending upon the position of said shutter means, passage of light from said one and the other light conductor member, respectively, to said photoelectric means; and control means for moving said shutter means between a first position for passing light from said crystal means and said one light conductor member, and a second position for passing light only from the other one of said light conductor members.

5. A probe for a scintillation meter, comprising, in combination, luminescent crystal means; elongated light conductor means longitudinally divided into two substantially equal light conductor members having surfaces capable of substantially total reflection, one of said conductor members being formed at its free outer end with an extension accommodating said crystal means so that light derived from the luminescence of said crystal means is passed only through said one of said light conductor members; photoelectric light-sensitive means arranged adjacent to the opposite ends of both said light conductor members; movable shutter means located across the path of light from said light conductor means to said photoelectric means for alternatively permitting, depending upon the position of said shutter means, passage of light from said one and the other light conductor member, respectively, to said photoelectric means; and control means for moving said shutter means between a first position for passing light from said crystal means and said one light conductor member, and a second position for passing light only from the other one of said light conductor members, said control means including a core member linked with said shutter means, and two electromagnetic coils associated with said core means for moving said shutter means between said positions depending upon alternative energization of one and the other of said coil means, respectively.

6. A probe for a scintillation meter, comprising, in combination, luminescent crystal means; elongated light conductor means longitudinally divided into two substantially equal light conductor members having surfaces capable of substantially total reflection; spacer means being provided for holding said light conductor members spaced from each other; one of said conductor members being formed at its free outer end with an extension accommodating said crystal means so that light derived from the luminescence of said crystal means is passed only through said one of said light conductor members; a light-tight housing enclosing said light conductor means and said crystal means; photoelectric light-sensitive means arranged adjacent to the opposite ends of both said light conductor members; movable shutter means located across the path of light from said light conductor means to said photoelectric means for alternatively permitting, depending upon the position of said shutter means, passage of light from said one and the other light conductor member, respectively, to said photoelectric means; and control means for moving said shutter means between a first position for passing light from said crystal means and said one light conductor member, and a second position for passing light only from the other one of said light conductor members.

7. A probe for a scintillation meter, comprising, in combination, luminescent crystal means; elongated light conductor means longitudinally divided into two substantially equal light conductor members having surfaces capable of substantially total reflection, spacer means being provided for holding said light conductor members spaced from each other, one of said conductor members being formed at its free outer end with an extension accommodating said crystal means so that light derived from the luminescence of said crystal means is passed only through said one of said light conductor members; a light-tight housing enclosing said light conductor means and said crystal means; photoelectric light-sensitive means arranged adjacent to the opposite ends of both said light conductor members; movable shutter means located across the path of light from said light conductor means to said photoelectric means for alternatively permitting, depending upon the position of said shutter means, passage of light from said one and the other light conductor member, respectively, to said photoelectric means; and control means for moving said shutter means between a first position for passing light from said crystal means and said one light conductor member, and a second position for passing light only from the other one of said light conductor members, said control means including a core member linked with said shutter means, and two electromagnetic coils associated with said core means for moving said shutter means between said positions depending upon alternative energization of one and the other of said coil means, respectively.

References Cited in the file of this patent

UNITED STATES PATENTS

| | | |
|---|---|---|
| 2,415,436 | Maris | Feb. 11, 1947 |
| 2,727,154 | Goldsworthy | Dec. 13, 1955 |
| 2,755,390 | Teichmann | July 17, 1956 |
| 2,759,602 | Baigent | Aug. 21, 1956 |